Figure 1:
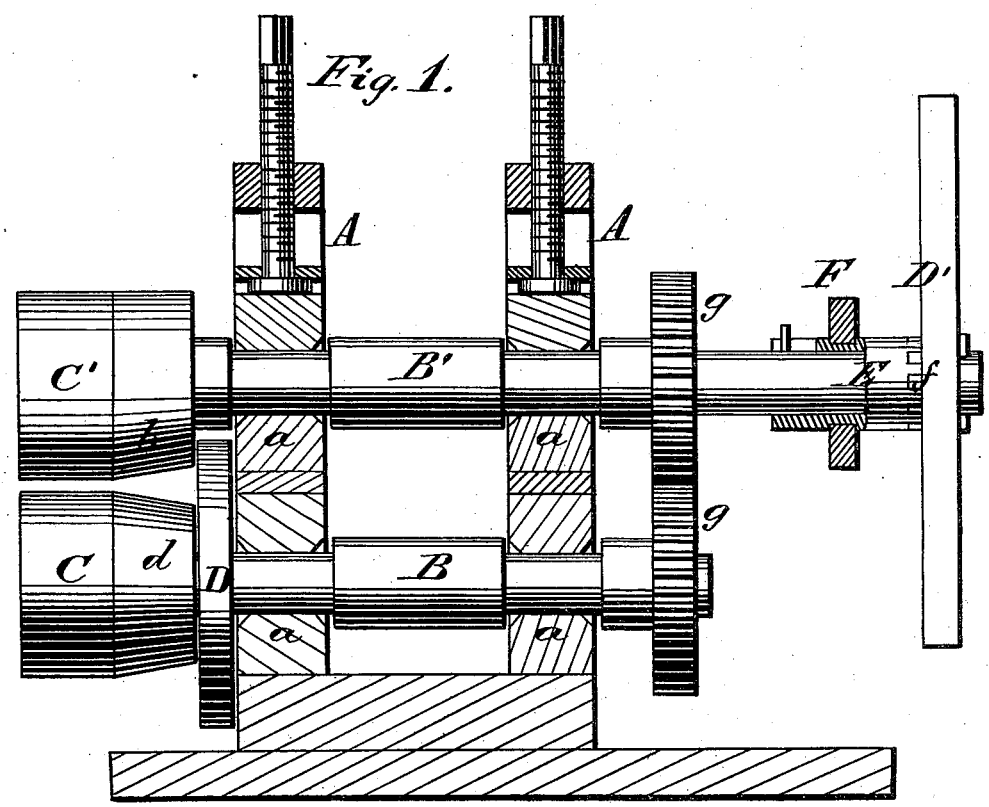

2 Sheets--Sheet 1.

W. M. WATSON.
Rolls for Welding Plow-Irons.

No. 164,621. Patented June 15, 1875.

WITNESSES

INVENTOR
Wm M. Watson

ATTORNEYS

THE GRAPHIC CO. PHOTO-LITH. 39 & 41 PARK PLACE, N.Y.

W. M. WATSON.
Rolls for Welding Plow-Irons.
No. 164,621. Patented June 15, 1875.
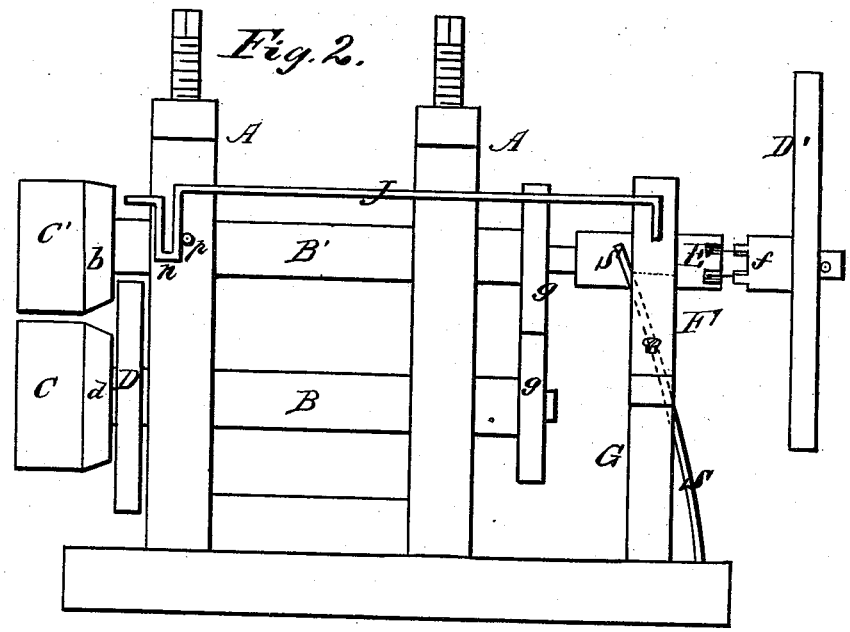
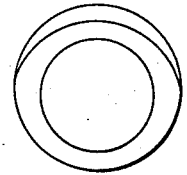 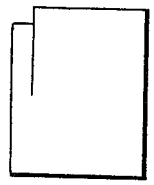 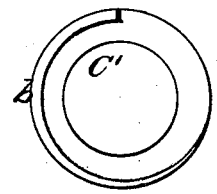 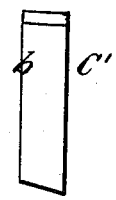

UNITED STATES PATENT OFFICE.

WILLIAM MEDD WATSON, OF TONICA, ILLINOIS.

IMPROVEMENT IN ROLLS FOR WELDING PLOW-IRONS.

Specification forming part of Letters Patent No. 164,621, dated June 15, 1875; application filed May 1, 1875.

*To all whom it may concern:*

Be it known that I, WILLIAM M. WATSON, of Tonica, in the county of La Salle and State of Illinois, have invented a new and valuable Improvement in Welding-Roll Machines; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side elevation, part sectional, of my machine, and Fig. 2 is a side view of the same. Figs. 3, 4, 5, and 6 are detail views of the same.

This invention has relation to means for welding "shins" on mold-boards or plow-shares; and my object is to improve the machine described in my Letters Patent bearing date on the 12th day of January, 1875, whereby I am enabled to weld a shin on either the upper or under side of a mold-board or share, and make a clean weld, as will be hereinafter explained.

In the annexed drawings, A A designate standards, in which journal-boxes $a$ are applied carrying two shafts, B B'. On the projecting end of the shaft B is a roller, C, which has one end tapered, as shown at $d$, which taper extends entirely around the roller C, and receives the shin-piece during the welding operation. The tapered end of the roller C abuts against a collar, D, which is keyed on shaft B, and which serves as a gage for the edge of a mold-board or share while making a weld. The upper roller C' is also beveled, as indicated in Figs. 3 and 4, at $b$, and is of a proper shape to give the required form to the shin while welding it.

In practice I prefer to construct the beveled portions $d$ $b$ on rings, which are made separate from the cylindrical portions of the rollers C C', so that a variety of forms may be used, as the nature of the work requires, with one pair of cylinders.

The two shafts B B' are geared together by means of twin wheels $g$ $g$, and on one end of the shaft B' is a crank, D', by which the shafts are rotated. The hub of this crank D' has teeth $f$ formed on it, with which a clutch-sleeve, E', engages, which sleeve is free to move endwise on shaft B', but not turn around it. An annular groove is made in the sleeve E, which is embraced by the forked end of an arm, F, which is pivoted on a post, G. S is a spring, which holds the clutch-sleeve engaged with the teeth on crank D', and causes shaft B' to turn with the crank E, and J is a rod, having a bent portion, $n$, on one end, which is designed to serve in combination with a stud, $p$, on one of the standards A for holding the clutch out of gear when it is necessary to stop the rollers.

By the means above described an attendant can stop and start the rollers at pleasure.

What I claim as new, and desire to secure by Letters Patent, is—

The combination of rollers C C', beveled, substantially as described, with a collar, D, for the purpose set forth.

In testimony that I claim the above I have hereunto subscribed my name in the presence of two witnesses.

WILLIAM MEDD WATSON.

Witnesses:
 ELIAS W. WOOD,
 P. L. McGREW.